April 28, 1936.  D. R. STAPLES ET AL  2,039,038

CONTROL SYSTEM

Filed Dec. 19, 1930   3 Sheets-Sheet 1

WITNESSES:

INVENTORS.
Dana R. Staples &
Simeon E. Newhouse.
BY
Wesley G. Carr
ATTORNEY

Fig.2.

April 28, 1936. D. R. STAPLES ET AL 2,039,038
CONTROL SYSTEM
Filed Dec. 19, 1930   3 Sheets-Sheet 3

WITNESSES:

INVENTORS.
Dana R. Staples &
Simeon E. Newhouse.
BY
ATTORNEY

Patented Apr. 28, 1936

2,039,038

UNITED STATES PATENT OFFICE 2,039,038

CONTROL SYSTEM

Dana R. Staples and Simeon E. Newhouse, Wilkinsburg, Pa., assignors to Westinghouse Electric and Manufacturing Company, a corporation of Pennsylvania Application December 19, 1930, Serial No. 503,389

15 Claims. (Cl. 172—239)

This invention relates to motor-propelled vehicles, and particularly to a control system for simultaneously controlling two or more motor-generator locomotives.

An object of our invention is to provide motor generator-type locomotives with a system of control that shall be simple in construction, efficient in operation and easily manufactured and installed.

A further object of our invention is to provide for varying the excitation of a plurality of generators to effect a proper balance of the loads of the generators.

A more specific object of our invention is the provision of a plurality of balance relays responsive to the difference in load current of a plurality of generators for controlling the excitation of the generators with reference to each other, thereby effecting a proper balance of the loads carried by the respective generators.

It is also an object of our invention to control a plurality of locomotive generators and the traction motors of the respective locomotives from a single control station, and to simultaneously vary the voltages of the locomotive generators and the counter-electromotive forces of the traction motors in inverse order, thereby varying the regenerative effect of the traction motors over a wide range.

Other and more specific objects of our invention, will become apparent from a study of the following specification, when considered in conjunction with the accompanying drawings, in which:

Fig. 2 is a schematic showing of the power equipment and control equipment on a second electrically propelled vehicle. The equipment shown in Fig. 2 is in every respect like the equipment shown in Fig. 1, except that the control circuits are shown so disposed that the controlling operations may be effected from a single vehicle.

Figure 1:
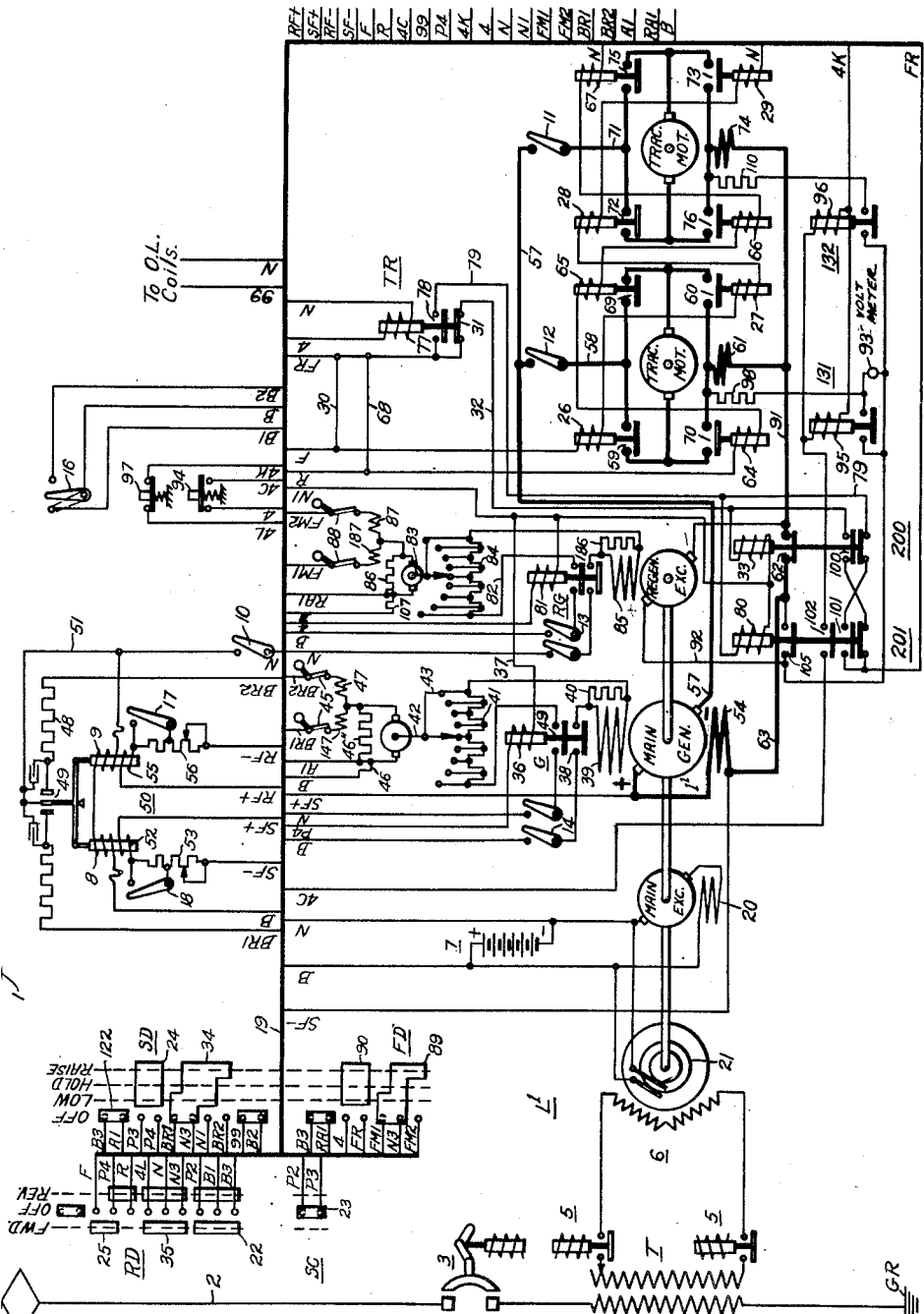
Figure 1 is a schematic showing of the power equipment and the control equipment on an electrically propelled vehicle.
Figure 2:
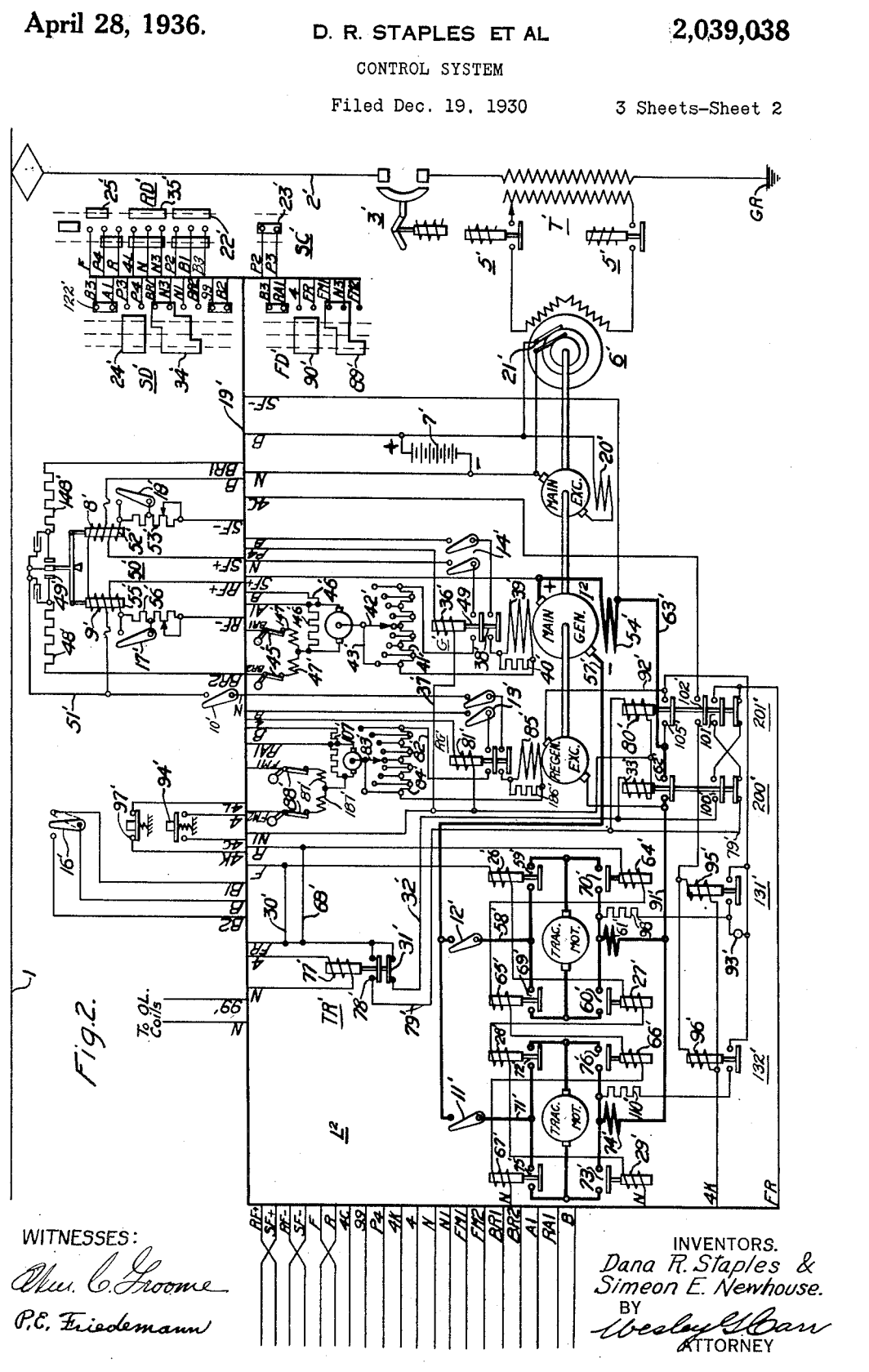

In the embodiment of the invention shown in Figs. 1 and 2 of the drawings, each of a plurality of locomotives L¹, L², etc., are provided with traction motors, Trac. mot., preferably of the series type. The traction motors may be supplied with direct-current power from a source of electrical energy comprising a variable-voltage direct-current main generator, Main gen., preferably of the compound wound type, mounted on each locomotive. The speed of all the traction motors may be controlled by either simultaneously varying the voltage of all the generators and/or by simultaneously varying the excitation of all the traction motors, or by both procedures.

A detailed description of the control apparatus on one vehicle or locomotive will suffice for an understanding of the control apparatus on other locomotives. The preliminary description of the various elements of our invention will thus be confined to Fig. 1 of the drawings.

During normal operation, the main exciter, main generator, and regenerative exciter, designated by the legends Main exc., Main gen. and Regen. exc., respectively, may be driven by a single phase synchronous motor 6, receiving its energy from a single phase trolley 1. The motor 6 and the generator and two exciters may be mechanically coupled in any suitable or well known manner to the shaft of the motor 6. It is to be noted also that the main exciter is coupled to the motor shaft for the purpose of charging a storage battery 7 and for supplying direct-current electrical energy to certain field windings of the main generators, the exciter itself, the regenerative exciter and the control apparatus to be hereinafter set forth.

The motor 6 may be suitably connected by contactors 5 to the secondary winding of a transformer T having also a primary winding disposed to be connected to the single-phase trolley 1 by the conductor 2 and the main line contactor 3.

To vary the excitation of the main generator and in consequence the loading thereof, and to vary the voltage of the regenerative exciter, these machines are provided with independently operable motor-operated rheostats. The respective motor-operated rheostats of the main generator and regenerative exciter are each operated by a split field series motor which is connected through a gear reduction (not shown) to the movable arms of the respective rheostat face plates. Clockwise rotation of the arms 42 and 83 on the face plates causes resistance to be shunted out of the field circuits of the two generators while counter-clockwise rotation of these arms causes resistance to be inserted in the respective field circuits.

In former practice, where manually operable field rheostats are used, to get reasonably successful operation and some load balance between the main generators of several locomotives, an expensive controller having from twenty-nine to thirty-five notches and a total of twenty-nine contact fingers, is used. In our invention, this expensive arrangement is replaced by two small four-position drum-controllers, i. e., the speed drum-controller, SD, and the field drum-controller, FD. A reverse drum-controller, RD is mechanically interlocked with both the speed drum-controller and the field drum-controller, so that the reverse drum-controller cannot be operated to any position from the position it may occupy unless both these controllers are in the "Off" position.

A balance relay, 50, is associated with the motor for operating the rheostat of the field of the main generator. This balance relay is energized by a pair of movable coils 8 and 9 receiving energy from a battery 7 or the main exciter or both. The balance relay is also provided with a second pair of stationary coils 52 and 55. One of these coils, say 52, is arranged to be energized responsive to the voltage drop across the series field winding 54 of the main generator on one locomotive, while the other coil 55 is arranged to be energized responsive to the voltage drop across the series field winding 54' of the main generator located on a second locomotive.

If the main generator in one locomotive is loaded too heavily or too lightly, with reference to the load carried by the main generator on the locomotive from which the control is to take place, the balance relay causes the operation of the proper motor-operated rheostat to reestablish the proper balance between the main generators.

The method of control and the apparatus just mentioned can probably be better understood by a study of the sequence of operation of all the elements of our control system.

In Figs. 1 and 2 all the elements of our control system are shown in deenergized position. If the operator desires to start the operation of two or more locomotives from the control cab of a single locomotive, he causes the operation of the line contactors 3, 3', etc., 5, 5', etc. in a well known manner. It is, of course, understood that controllers SD, SD', etc., FD, FD', etc., RD, RD', etc., and SC, SC', etc. are all in the "Off" position.

With the line contactors above-mentioned in closed position, the synchronous motors 6, 6', etc., will be brought into synchronism in a well known manner, and all the main generators on the respective locomotives will generate a low voltage if switches 14 and G are in closed position. The voltage is low because provision is made to keep the resistance value of the field circuits a maximum so that the traction motors, Trac. mot., when connected to the main generators, will start smoothly.

Before any of the electrical units can start to operate, switches 11, 12, 13, 14 and 16 should be closed, and the corresponding switches on each of the other locomotives should be closed.

Figure 3:
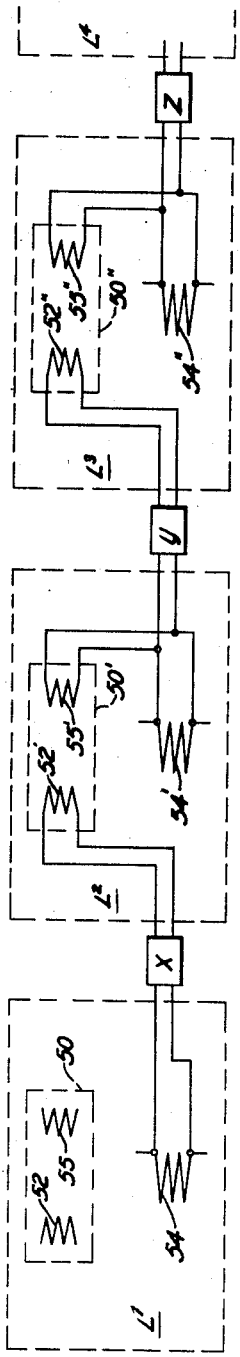
Figs. 3 and 4 show schematically two ways of inter-connecting particular control units of our invention.
Figure 4:
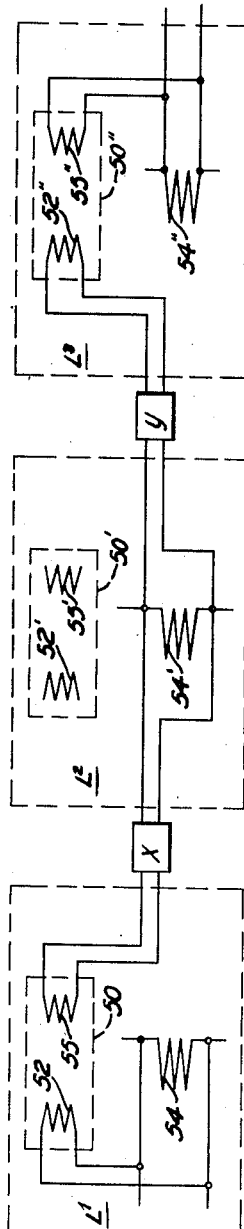

When two or more locomotives are to be operated and are to be controlled from a single cab, a balance relay in one cab should be eliminated from the control circuits. For the balanced operation of two or more locomotives, it is nevertheless immaterial which balance relay is eliminated from the control circuits. This is clearly shown in Figs. 3 and 4. If the control is to be from locomotive L¹, either balance relay 50 on locomotive L¹ may be eliminated (see Fig. 3) or the balance relay 50' may be eliminated (see Fig. 4). When the circuit arrangement is as shown in Fig. 3, the load of the main generator on locomotive $L^n$ is balanced against the load of the main generator on locomotive $L^{n-1}$ and the load of the main generator on locomotive $L^{n-1}$ is balanced against the load of the main generator on locomotive $L^{n-2}$ and so on until the loads are all balanced, i. e., the load of the main generator on locomotive $L^{n-(n-2)}$ is balanced against the load of the main generator on locomotive $L^{n-(n-1)}$ or L'.

When the balance relay 50' is eliminated, then the loads of the main generators on all the leading locomotives and all the trailing locomotives are balanced against the load of the main generator on locomotive L². The control may take place from the cab of any one locomotive, regardless of which balance relay is eliminated. For reasons of convenience, the balance relay on the locomotive or the vehicle from which the control takes place is usually eliminated.

Assuming the operator wishes to control all the locomotives from locomotive L¹ and the switches already mentioned have been closed. The switch 10 and the pair of switches 17 and 18 associated with coils 52 and 55 are left in open circuit position, while the corresponding switches on the other locomotives are closed.

A like circuit is established on each locomotive, except locomotive L¹, which circuit extends from the positive terminal of the battery 7' through conductor B, movable coils 8' and 9', conductor 51', switch 10' and conductor N to the negative terminal of the battery 7'. The respective main series wound exciters, Main exc. may be considered as supplying energy to the circuits traced.

A circuit is also established from the positive terminal of the main generator on locomotive L¹ (see Fig. 1) though conductor SF+ to conductor RF+ of the locomotive L², coil 55', a portion of resistor 56', conductor RF— to conductor SF— of locomotive L¹, series field 54 to the positive terminal of the main generator on locomotive L¹. From a study of this circuit, it will be understood that coil 55' is energized in proportion to the voltage drop across the series field windings 54 and in consequence is responsive to the load of the main generator I¹.

Before proceeding further with the discussion of a sequence of operation, attention is called to the fact that conductors RF+, SF+, RF—, SF—, F and R of locomotive L¹ connect to conductors SF+, RF+, SF—, RF—, R and F, respectively, of the locomotive L².

The adjustable resistors 53 and 56 and the switches 17 and 18 are for the purpose of controlling and calibrating the balance relay 50. A similar purpose is served by corresponding switches and resistors associated with each balance relay. Once the balance relays are properly calibrated, the loads of all the main generators will be properly balanced.

A third circuit extends from the positive terminal of main generator I² through conductor SF+, coil 52', resistor 53', conductor SF—, the series field windings 54' to the positive terminal of main generator I². Coil 55' is thus responsive to the load of generator I¹ while coil 52' is responsive to the load on main generator I². The magnetic effect of coil 8' opposes the magnetic effect of coil 52' and the magnetic effect of coil 9' opposes that of coil 55'. When the loads of the two main generators are unbalanced, the balance relay 50' will be caused to operate as will be pointed out more in detail hereinafter.

The attendant, to start and also thereafter raise the speed of the several vehicles moves the controller SD to the "Raise" position and the controller, RD to "Fwd" position. A circuit is thus established from the positive terminal of battery 7 and the main exciter, through conductor B, switch 16, conductor B1, controller segment 22 of reverse drum-controller RD, conductor P2, controller segment 23 of series controller SC, conductor P3, controller segment 24 of speed controller SD, conductor P4, controller segment 25 of reverse controller RD, conductor F through conduit 19, coils 26, 27, 28 and 29 of the directional contactors for the two traction motors on locomotive L¹ to negative conductor N. The directional contactors for all the other traction motors are also energized by a parallel circuit. This circuit may be traced from conductor F to locomotive L², etc. to conductor R on L² coils 64', 65', 66' and 67' to the negative conductor N. The conductor B is connected to the positive terminals of all the main exciters, and the conductor N is connected to the negative terminals of all the main exciters, i. e., conductor B and N are carried to all locomotives, and to the controllers SC, FD, RD and SD on locomotive L¹ whereby all the equipment may be controlled from locomotive L¹.

A further circuit may be traced from positively energized conductor F through conductor 30, conductor FR, lower or back contact members 31 of transfer relay TR, conductor 32, actuating coil 33 of the starting switch 200, conductor N1, controller segment 34, of controller SD, conductor N3, controller segment 35 to negative conductor N. A corresponding circuit is also established on all other locomotives, because conductor F is carried over to locomotive L² as R and through conductor 68' energizes switch 200'.

Since conductor P4 is positively energized a circuit is established through actuating coil 36 of field switch G and conductor 37 to the negatively energized conductor N1. The circuit for all the main generator fields is thus completed. The circuit for the field 39 of main generator I¹ may be traced from the positively energized conductor B, one blade of switch 14, contact members 38, the shunt or main field winding 39 connected in parallel with a stabilizing discharge resistor 40, conductor 43, rheostat arm 42, some resistor sections of the motor operated rheostat, contact members 49 and a second blade of the switch 14 to the conductor N.

Since the starting switch 200 and the switch G are closed, the main generator I¹ begins to develop some voltage, and the traction motors will begin to operate to drive the locomotive. It is, of course, understood that events substantially the same as these discussed, take place on all the other locomotives. The circuit for the traction motors on locomotive L¹ may be traced from the negative terminal of the main generator through conductor 57, the two parallel circuits through switches 11 and 12, contact members 59 and 72, the armatures of the traction motors, contact members 60 and 73, and the series field windings 61 and 74, conductor 91, contact members 62, of the starting switch 200, conductor 63, series field 54 of main generator I¹ to the positive terminal of the main generator.

To assure that the traction motors of all the locomotives rotate in the same direction, a different set of directional contactors are operated on each locomotive. On locomotive L², contact members 75' and 76' and 69' and 70' close. The current traversing all the traction motors will thus be in the same direction and the locomotives will move in the same direction. From the circuits traced for the traction motors on locomotive L¹, the armature current traverses the armatures of the motors from right to left. If the same operative connections are assumed for all locomotives, the armature currents for the motors on the other locomotives should be from right to left. The operation of the directional contactors on locomotive L², above specified, effects just such uniformity of operation of all the traction motors.

For a given excitation of the main generators, the speed of the traction motors will be some definite value. To gradually accelerate the locomotives, the controller SD is retained in the "Raise" position, whereby the excitation of all the main generators is increased gradually and at substantially the same rate. The circuit for the motor operating one rheostat may be traced from conductor B through resistor section 46, the resistor 46" and the armature of the rheostat motor in parallel, the series field 47, the right-hand limit switch 45, conductor BR2, controller segment 34 of controller SD to the negatively energized conductor N3. The limit switches 45 are disposed to be operated by the rheostat arm 42, and when operated stop the rheostat motor at the limits of travel of the rheostat arm. Since the conductors B and BR2 are carried directly across all the locomotives, the motor operated rheostats of all the main generators are operated simultaneously and are controlled by the position of controller SD. During acceleration of the locomotives, the loads on the main generators may become unbalanced. To prevent this to take place, the controller SD should, for the most satisfactory acceleration, be moved back and forth between the "Raise" and the "Hold" positions.

When the vehicles, train, or locomotives, have attained the speed desired, the controller SD is moved to the "Hold" position. This operation of the controller SD interrupts the circuit for all the main generator rheostat motors with the result that the rheostat arms 42, 42' etc., are retained in a given position thus substantially fixing the speed of the traction motors.

When the load of the main generator I² is either greater or less than the load on the main generator I¹, the balance relay 50' is caused to operate, and effects a balance of the loads. Assuming that the load of the main generator I² is greater than the load of main generator I¹, then the voltage drop across series field 54' is greater. In consequence, coil 52', responsive to the voltage drop across 54', is more heavily energized than coil 55' which is responsive to the voltage drop across series field 54. The balance relay 50' is thus caused to operate, moving its contact arm in a clockwise direction about its knife edge pivot.

Operation of the balance relay 50' establishes a circuit from the positive terminal of battery 7' through conductor B, rheostat section 46', the resistor 146' and the armature of the rheostat motor in parallel, series field 147', the right-hand limit switch 45', conductor BR1, resistor 148', the right hand contact members 49', conductor 51' and switch 10' to the negative conductor N. It will be noted that series field 147' is in this case used, thereby causing the rheostat motor to operate in opposite direction to the direction of rotation during acceleration of the locomotives.

While the right-hand contact members 49' remain closed, the rheostat arm will be caused to move in a clockwise direction to insert more and more resistor sections 41' in series with the main shunt field windings 39'. As soon as the load of main generator I² equals the load of main generator I¹, the right-hand contact members 49' open, thus stopping the operation of the rheostat motor. If the load should again become unbalanced, the operation is repeated. If the load of main generator I² is less than the load of main generator I¹, the rheostat arm 42' will be moved in a counter-clockwise direction to decrease the excitation of the main generator I² by an amount sufficient to establish proper load balance.

To decrease the speed of the locomotives, the SD controller is moved to the "Low" position. In the "Low" position, the contact finger on conductor BRI engages the controller segment 34 with the result that all the rheostat motors operate to increase the resistance in series with the field windings 39, 39', etc. to decrease the voltage of the main generators and thus to decrease the speed of the traction motors.

When the controller SD is in the "Hold" position, neither the contact fingers on conductor BRI nor on conductor BR2 make engagement with controller segment, yet when there is an unbalance of load, the balance relays 50', 50" etc. establish the necessary circuits for the respective main generator rheostat motors to reestablish the balance of load.

The balancing operation of all the balance relays is not necessarily always in the same direction. The load on the main generator I¹ may be greater than the load on main generator I² and may be less than the load on main generator I³, yet when the movable contact members of each balance relay is in the neutral or open circuit position, the loads are all balanced to the load of one main generator.

Assuming that attendant wishes to stop the locomotives by the use of the air brakes, there being no need nor occasion for using regenerative braking hereinafter discussed, he moves the controller SD to the "Off" position. The tractive effort of the traction motors ceases because the energy supply to the main field windings is interrupted at the controller segment 34 and the contact fingers on conductor NI. The air brakes are then used to stop the locomotives as desired.

The movement of the controller SD to the "Off" position establishes a circuit from the positively energized conductor B through switch 16, conductor BI, controller segment 22, conductor B3, controller segment 122, conductor AI through the main generator rheostat motor to conductor BRI, controller segment 34 of controller SD to the negatively energized conductor N3. Attention is called to the fact that for this circuit for the rheostat motor, the resistor section 46 is shunted and that the motor circuit can only be completed through conductor BRI, i. e., through series field winding 147.

The connection through series field 147 determines the direction of rotation of the motor, the direction of rotation being such that more and more resistor sections 41 are inserted in the main generator field circuit. All the other rheostat motors move in a corresponding direction to increase the resistance in circuit with the respective main field windings 39', 39", etc.

Shunting of the resistor sections 46, 46' etc. increases the speed of operation of the rheostat motors considerably. This is a very desirable feature. The voltage of the main generators should be a minimum when the attendant again desires to start the locomotives. When all the resistor sections 41, 41', etc. have been inserted in circuit with main field windings of the main generators, the limit switches 45, 45', etc. are operated and the rheostat motors stop. Since the selected limit switches in the circuits of conductor BR2 are closed, operation of the limit switches to stop the rheostat motors does not interfere with the starting and accelerating of the locomotives.

To secure regeneration with our control scheme, a regenerative exciter, Regen. exc., is mounted on the shaft of each of the synchronous motors 6, 6', etc. Each regenerative exciter is provided with separately excited field windings. A motor operated rheostat is associated with each of the field windings, and the operation of the regenerative exciter rheostat motor is controlled from the control station or cab selected. Consistent with previous discussions, in the discussion following the field drum-controller FD will be considered the controller, selected as the control station, and all the controllers on the locomotives not selected are initially moved to the "Off" position.

Assuming that the controller SD is in the "Hold" position, the train operating at a desired speed, and regenerative braking is to be effected, the attendant operates the field drum-controller FD to the "Raise" position. Since the reversing controller is in the "Fwd" position, conductor F is positively energized and a circuit is completed from conductor F through conductors 30 and FR to controller segment 90 of controller FD, conductor 4, actuating coil 77 of transfer relay TR to the negatively energized conductor N.

Operation of the transfer relay TR causes the interruption of the circuit for the coil 33 at the contact members 31 but because of a holding circuit from a branch of conductor FR (see lower right hand corners of Figs. 1 and 2) through the lowermost or back contact members of switch 201 and the contact members 100 to the actuating coil 33, the switch 200 does not open. However, with the operation of the transfer relay TR a circuit is established for coil 80 of switch 201. This circuit may be traced from conductor FR through the contact members 78 of relay TR, conductor 79, actuating coil 80 of the switch 201 to the negatively energized conductor NI. The operation of switch 201 establishes its own holding circuit from the lower branch of conductor FR through contact members 101, the lowermost or back contact members of switch 200, and conductor 79 to coil 80. The switches 200 and 201 are provided with the holding circuits and interlocks so that the sequence of operation of these switches will not be disturbed. Switch 200 does not and cannot open until switch 201 has operated. However, upon operation of switch 201, the contact members 101, 102 and 105 close whereas the contact members 100 and 62 open.

These operations establish a circuit for the traction motors which circuit may be traced from the negative terminal of main generator I¹ through conductor 57, the parallel circuits through switches II and I2, contact members 59 and 72, the traction motor armatures, and the series field windings 61 and 74, conductor 91, the regenerative exciter, conductor 92, contact members 105, conductor 63, series field 54 and back to conductor 57 through the armature of the main generator.

As long as the regenerative exciter field windings are not excited the operation of the equipment is not affected by the opening of switch 200 and the closing of switch 201. As heretofore pointed out, conductor 4 is positively energized and in consequence, switch 13 being in closed position, the regenerative exciter field switch RG is closed by the operating circuit from conductor 4 through coil 81 to the negatively energized conductor N1. The field windings 85 are thus energized by a circuit extending from conductor B through the right-hand portion of switch 13, the upper contact members of field switch RG, conductor 82, all of the resistor sections 84, rheostat arm 83, resistor 186 and field windings 85 in parallel circuit relation, the lower contact members of switch RG and the left-hand portion of switch 13 to conductor N.

As long as all the resistor sections 84 are in circuit with the field 85, the voltage of the regenerative exciter is low. The connection is, however, in such a direction that the voltages of the main generator and the regenerative generator are additive.

Since the controller FD is still in the "Raise" position, a circuit is established for the rheostat motor for the field windings 85. This circuit may be traced from conductor B through the resistor 86 and the rheostat motor armature, series field 87, the right-hand limit switch 88, conductor FM2, controller segment 89 of controller FD to the negatively energized conductor N3. The rheostat motor thus operates the arm 83 in a clockwise direction to shunt successive sections of the resistor 84, whereby the voltage of the regenerative exciter rapidly increases.

As previously pointed out, the voltages of the main generator and the regenerative exciter are additive. The negative terminal of the regenerative exciter is thus connected to the left-hand contact elements of the stabilizing switches 131 and 132, whereas the negative terminal of the main generator is connected to the right-hand contact elements of the stabilizing switches through the traction motor circuits and the stabilizing resistors 98 and 110. When the voltage of the regenerative exciter has built up sufficiently to effect regenerative braking, a zero potential will be indicated by the voltmeter 93.

When the voltmeter 93 indicates no voltage, the attendant depresses the separate excitation push-button switch 94, thus establishing a circuit from the positively energized conductor 4 through the switch 94, conductor 4C, contact members 102 of switch 201, actuating coils 95 and 96 of the switches 131 and 132 respectively in parallel circuit relation, conductor 4K, stop push-button switch 97, conductor 4L, controller segment 35 of controller RD to the conductor N.

As the rheostat arm continues to shunt more sections of resistor 84, the excitation of the traction motors is greatly increased to some extent by series excitation, but principally by separate excitation. The separate excitation takes place from the regenerative exciter by a circuit extending from the negative armature terminal through conductor 92, the parallel circuit through the contact members of stabilizing switches 131 and 132, the stabilizing resistors 98 and 110 and the field windings 61 and 74, and conductor 91 to the positive armature terminal.

When moving down a grade or when it is desired to stop the locomotives, the traction motors are driven at a high speed while heavily excited from the regenerative exciter. The result is that the armature current through the main generator I¹ reverses, thus operating as a motor to drive the synchronous motor 6 as a generator to return energy to the trolley 1.

From the foregoing discussion of the regenerative braking it should not be inferred that the balancing operation of the balance relays and the regenerative operation take place successively. The controller RD can not be moved when any one of the controllers FD, SC, and SD are in any operative position, but when controller RD is in an operative position the other controllers can be moved at will and independently of each other. Obviously, when controller SD is in the "Hold" position the balancing relays balance the loads when the generators I¹, I², etc., operate as generators and balance the loads or output of the machines I¹, I², etc., when operating as motors to return energy to the trolley 1.

Where regeneration is to take place on a long down grade and the speed of the train is not to decrease, operation of the rheostat motor of the regenerative exciter may be sufficient. Under such condition, the controller FD may be oscillated between the "Raise" and "Hold" positions, or it may even, for grade changes, be necessary to oscillate the controller between the "Hold" and "Low" position.

Where the grade is steep or the locomotives are to be rapidly stopped by regenerative braking, the controller SD, controlling the rheostat motor for the main generator I¹, is moved to the "Low" position or when desirable, is oscillated between the "Hold" and "Low" position while the controller FD is moved to the "Raise" position or when desirable, is oscillated between the "Raise" and "Hold" positions. From the foregoing discussion, it will be apparent that our invention provides a very desirable and highly flexible regenerative braking control. Furthermore, since the respective control conductors P4, 4, N1, FM1, FM2, BR1, BR2, RA1 and B and N may be carried across to any number of locomotives by suitable connector receptacles, $x$, $y$, $z$, etc., the regenerative braking control may be effected from a single control station.

Not only does our invention provide a very flexible regenerative braking control, but the speed of the traction motors, when desired, may be increased, by the use of the regenerative exciter and control, to a high value during motoring. With the main generators heavily excited and the regenerative exciter not so heavily excited, the voltage across the traction motors is increased but, in view of the circuit for separate excitation, the excitation of the traction motors is not proportionately increased. The result is that the regenerative control scheme may be used to give high speed motoring operation, i. e., may be used to control the speed of the traction motors to any value desired.

When the controller FD is moved to the "Off" position, conductor RA1 is connected to the positively energized conductor B3 and a circuit is established for the rheostat motor of the regenerative exciter. This circuit shunts resistor section 107 and is completed through the series field 187, limit switch 88, conductor FM1 and controller segment 89 of controller FD to the conductor N3. The rheostat motor thus operates at a high speed, resistor 107 of relatively high resistance value being shunted, to reinsert all the resistor sections of resistor 84 in the circuit of the field windings 85. The arm 83 is thus always in the start position when the controller FD is in the "Off" position.

The switch 16 is a control and reset switch. As heretofore stated, the switch is moved to connect conductor B to B1 to control the operation of the entire system, however, if the over-load protective switches have operated or none of the control equipment is energized, the switch 16 is first moved to connect conductor B to B2 and thus to conductor 99 and the overload switches to conductor B and after these units have been set in proper operative relation, the switch 16 is moved to the position heretofore discussed.

We do not wish to be restricted to the specific structural details, arrangement of parts or circuit connections herein set forth, as various modifications thereof may be effected without departing from the spirit and scope of our invention. We desire, therefore, that only such limitations shall be imposed as are indicated in the appended claims.

We claim as our invention:

1. In a control system for three or more locomotives, each provided with control apparatus, in combination, a main generator in each locomotive, means for controlling all of said generators from a single control station, a series field winding for each main generator, a main separately-excited field winding for each generator, a load balance relay in each locomotive responsive to the electrical condition in the series field windings of one main generator and one of the other main generators whereby the load of each of the main generators is balanced to the load of one of the main generators.

2. In an electrical control system for controlling the operation of three or more locomotives from a single control station, a main generator on each locomotive, a separately excited field winding for each generator, a source of electrical energy having a constant voltage for exciting the field windings, a load balance relay in each locomotive responsive respectively to the load unbalance of successive main generators with reference to one main generator and, means responsive to the operation of the balance relays for varying the excitation of successive main generators to balance the load of each of the main generators to the load of the one named generator.

3. In an electrical control system for controlling the operation of a pair of locomotives from a control station on either one of the locomotives, in combination, a main generator having a series field winding on each locomotive, a main field winding for each generator, a balance relay in both locomotives, each of said relays being responsive to the electrical condition of both generators, controllers for selecting the control station and balance relay from which the operation of the locomotives may take place and means associated with each generator responsive to the operation of the balance relay for varying the excitation of the main field windings of one generator to balance the load of that generator with the load of the other generator.

4. In a control system for a plurality of locomotives adapted to be supplied from a common source of electrical energy, a motor-generator set on each locomotive, traction motors driven by the generators of the motor-generator sets, a regenerative generator and main exciter driven by the motor of each locomotive, a plurality of balance relays responsive to the load unbalance between the generators of successively electrically adjacent locomotives to balance the load of all the generators and a control station on one locomotive for selectively controlling the voltages of the main generator and regenerative generator on each locomotive.

5. In a control system for a plurality of locomotives adapted to be supplied from a common source of alternating-current electrical energy each locomotive being provided with control apparatus comprising, a synchronous motor adapted to be connected to the source of energy, a main generator, a main exciter, and a regenerative dynamo-electric machine driven by the synchronous motor, a series field winding for the main generator, main field windings for the main generator adapted to be excited from the main exciter, a field winding for the regenerative dynamo-electric machine adapted to be excited from the main exciter, a motor operated rheostat for the field of the regenerative machine, a motor operated rheostat for the main field windings of the main generator, control apparatus of substantially identical electrical and mechanical characteristics on other locomotives, in combination with a control station on one locomotive for selectively controlling the operation of all the motor operated rheostats and balance relays responsive to the load unbalance between one main generator and a second main generator, the second main generator and the third, the third and fourth, etc., to balance the load of main generators two, three, four, etc. to the load of the first.

6. In a control system for a plurality of locomotives, each being provided with control apparatus, in combination, a main generator on each locomotive, a main exciter and regenerative generator having field windings mechanically connected to each main generator, motors for driving the main generators and the machines connected thereto, traction motors driven by the main generators, means mounted on one locomotive for connecting and disconnecting the regenerative generator from the control apparatus, control means for controlling the excitation of the regenerative generator to effect, as desired, regeneration or an increase of speed of the traction motors on each locomotive and a plurality of balance relays for balancing the loads of all the main generators.

7. In a control system for a plurality of locomotives, each provided with control apparatus, in combination, a source of electrical energy, a motor adapted to be connected thereto, a main generator, a main exciter and regenerating generator driven by the motor, traction motors connected to the main generator, switching means for connecting the regenerating generator to the traction motors and the main generator, field windings for the respective generators, means for varying the excitation of the field windings of the respective generators, a plurality of other locomotives having the named equipment, in combination with a control station on one locomotive for controlling the means for varying the excitation of all the main generators and all regenerating generators, means at the control station for controlling all the switching means and a plurality of balance relays for balancing the loads of all the main generators.

8. In a control system for a plurality of locomotives adapted to be supplied from a common source of electrical energy, a motor-generator set on each locomotive, traction motors driven by the generators of the motor generator sets, a regenerative generator driven by the motor of each motor-generator set, means for varying the voltage of the regenerative generators, a plurality of balance relays responsive respectively to the difference in load current between the generators of a pair of pairs of main generators, said pairs including two main generators but once and the remaining generators no more than twice, whereby the loads of all the main generators are balanced to the load of one main generator, and a single control station on one locomotive for controlling the operation of the balance relays and the means for varying the voltage of the regenerative generators.

9. In a control system for a plurality of locomotives adapted to be supplied from a common source of alternating-current electrical energy, each locomotive having equipment comprising, a synchronous motor, a main generator driven by the synchronous motor, series field windings for the generator, main field windings for the generator, a source of direct-current constant-voltage source of electrical energy for exciting the synchronous motor and the main field windings of the generator, a rheostat for varying the voltage impressed on the main field windings of the generator, a regenerative generator, field windings for the regenerative generator adapted to be connected to said constant-voltage source, a rheostat for varying the voltage impressed on the field windings of the regenerative generator, a pair of independently operable motors for driving both said rheostats, traction motors operable in response to the voltage variations of the main generator, a single control station mounted on one locomotive for independently or simultaneously controlling the operation of the motors operating the rheostats and means for balancing the loads of all the main generators.

10. In a control system for controlling the operation of a plurality of locomotives adapted to be supplied with electrical energy from a common source each locomotive being provided with a main generator, a regenerative generator, a motor mechanically connected to the generators and electrically connected to the source, traction motors adapted to be electrically connected to the main generator, switching means for connecting the main generator and traction motors, switching means for connecting the regenerative generator to the traction motors and main generator, means for varying the voltage of the main generator, means for varying the voltage of the regenerative generator to increase or decrease the excitation of the traction motors whereby regeneration or high speed operation may be effected, a balance relay on each locomotive for balancing the load of any two main generators, a single control station for controlling said voltage varying means and means for selectively connecting the balance relays to balance the loads of all the main generators in a predetermined sequence.

11. In a control system for a plurality of generators on electric locomotives, a main generator having series field windings and main separate field windings on each locomotive, a balance relay on each locomotive, a control station on each locomotive from which all locomotives may be controlled, means for inter-connecting the series field windings of the first generator with the balance relay on the second locomotive, means for interconnecting the series field windings of the second generator to the balance relays on the second and third locomotives, means for interconnecting the series field windings of the third generator with balance relays on the third and fourth locomotives, etc., means associated with the second, third, fourth, etc. generators responsive to the load unbalance between the generators on the first and second, second and third, etc. locomotives to balance the load of generators two, three, etc. to the load carried by the first generator.

12. In a control system for a plurality of generators having series field windings and main separately excited field windings mounted respectively on an equal number of vehicles, a source of alternating current power, a synchronous motor on each vehicle for driving all the generators at the same speed, traction motors having field windings mounted on each vehicle and connected to the generator on that vehicle, means responsive to the voltage drop across the series field windings of the generators for controlling the excitation of the separately excited field windings to balance the loads of all the generators, a regenerative exciter on each vehicle, and means for effecting separate excitation of the traction motors on each vehicle from the regenerative exciter on that vehicle to provide regenerative braking for the vehicles.

13. In a control system for a plurality of electrically driven vehicles, a generator having series field windings, and main separably excited field windings mounted on each vehicle, a source of alternating current power, a synchronous motor on each vehicle for driving all the generators at the same speed, traction motors having field windings mounted on each vehicle and connected to the generator on that vehicle, means responsive to the load unbalance of the generators for controlling the excitation of the separately excited field windings to balance the loads of all the generators, a regenerative exciter on each vehicle driven by the respective synchronous motors, means for effecting separate excitation of the traction motors from the regenerative exciter to provide regenerative braking for the vehicles and means for simultaneously controlling from one vehicle the excitation of the regenerative exciters and the main generators to vary the regenerative braking effect over a wide range.

14. In a control system for electrically operated locomotives, a plurality of generators mounted on the respective locomotives, means for driving the generators at substantially the same speed, traction motors on each locomotive connected to the generator on that locomotive, means for connecting the traction motors for regenerative braking, a regenerative exciter on each locomotive for controlling the excitation of the traction motors on that locomotive during regenerative braking, a pair of controllers adapted to simultaneously vary the voltages of the generators and regenerative exciters in inverse order to vary the regenerative braking effect over a wide range and means responsive to the load unbalance of the generators to balance the loads thereof.

15. In a control system for three or more locomotives, each provided with control apparatus, in combination, a main generator on each locomotive, means for controlling all of said generators from a single control station, separately excited field windings for each generator, means for gradually varying the resistance values of the respective field windings, a motor for each of said resistance varying means, and load balancing means in each locomotive responsive to the unbalance in loads of a plurality of generators with reference to the load on one generator to control the operation of the motor operating the resistance varying means to establish a load balance between all the generators.

DANA R. STAPLES.
SIMEON E. NEWHOUSE.